DEVICE TO FORM THE TWO'S COMPLEMENT OF
A TRAIN OF BINARY CODED PULSES
Filed March 11, 1954

INVENTORS
PAUL FRANÇOIS MARIE GLOESS
PAUL PIERRE NAMIAN

ATTORNEY

United States Patent Office 2,941,719

Patented June 21, 1960

2,941,719

DEVICE TO FORM THE TWO'S COMPLEMENT OF A TRAIN OF BINARY CODED PULSES

Paul François Marie Gloess, Paris, and Paul Pierre Namian, Asnieres, France, assignors to Societe d'Electronique et d'Automatisme, Courbevoie, Seine, France Filed Mar. 11, 1954, Ser. No. 415,648

Claims priority, application France Mar. 19, 1953

13 Claims. (Cl. 235—164)

The present invention relates to a device for translating trains of electrical pulses which are so encoded as to represent algebraic values of numerical quantities expressed in the binary system of numeration.

In electric digital binary computers, any coded pulse train therein comprises a predetermined number of pulse periods, covering an overall time interval which often is called a minor cycle of the computation. In each pulse period, the value of the concerned digit may be one or zero. Most often, the value one is represented by a discrete pulse in the concerned pulse period, and the value zero, by the absence of any pulse in said pulse period. When the simulated quantity is an algebraic one, a plus-sign or a minus-sign indication must be given together with the value of the arithmetical part of said quantity. It is now quite conventional to give this sign indication within the first pulse period of a minor cycle and, for instance, said first pulse period carries a discrete pulse for the representation of the minus-sign and does not carry any pulse for the representation of the plus-sign. The other pulse periods then carry the indications of the digits of the arithmetical value. Considering for instance a pulse train comprising $n$ pulse periods, each of which has a duration equal to $\theta$, the correlation between the sequential pulse periods and the significance of the digital pulses in these periods may be established as follows:

$$\frac{d_1\ d_2\ d_3\ d_4\ d_5\ d_6\ \ldots\ d_{n-1}\ d_n}{\pm\ a_0\ a_1\ a_2\ a_3\ a_4\ \ldots\ a_{n-3}\ a_{n-2}}$$

wherein $d_1, \ldots d_n$ represent the successive digital pulse periods (and casually the digital clock pulses in said periods) and wherein $a_0 \ldots a_{n-2}$ represent the digital values of the coefficients of the binary development:

$$a_1.2^0+a_1.2^1+\ \ldots\ a_{n-3}.2^{n-3}+a_{n-2}.2^{n-2}$$

of any arithmetical value which may be written with $(n-1)$ terms in the binary system of numeration.

In view of the algebraic addition of coded pulse trains in electric digital computers of this kind, it is often required to make use of a device by which, each time a coded pulse train of the above-specified kind is applied to its input, this train is translated to its output without varying its numerical value if no minus-sign pulse exists in its first pulse period; however, if such a pulse exists the numerical value of the pulse train is so varied, that the arithmetical part of the outgoing coded train then represents the value of the complement to $2^{n-1}$ of the actual value of said arithmetical part in the incoming pulse train. A translating device of this kind may be called an algebraic code converter, for short.

An object of the invention is to provide for such an algebraic code converter a particularly plain and efficient structure.

A further object of the invention is to so provide said structure that it operates according to a relation between the value of a numerical quantity and its complemental value as defined. In conventional algebraic code converters, the relation which is usually observed, considers that the complemental value of a numerical quantity is obtained by taking the negative representation of said numerical quantity and adding +1 to said negative representation. A negative representation of a numerical quantity is obtained by changing for any and all of its digits, the value 1 to 0 and conversely the value 0 to 1. In contradistinction, the present invention considers, for the provision of an algebraic code converter, that the relation between the value of a numerical quantity and its complemental value may be expressed by stating that these values are of identical presentation in corresponding digits from their first digits to their first significant digits, inclusively, and then differ in that the remaining portion of one of said presentation is the negative of the other one to their last corresponding digits inclusively.

An algebraic code converter according to the invention thus is characterized in that it comprises in combination, means for receiving an incoming pulse train which has been previously algebraically encoded, means responsive to the presence of a discrete pulse in the first period of said incoming train and means responsive to the presence of the first arithmetically significant pulse in said train in any other pulse period of said train than the first one, and means under control from said first and second pulse responsive means for changing the numerical value into its complemental value of that part of the incoming train following said first digital significant pulse period each time said first and second responsive means are activated from said incoming pulse train receiving means.

This and other features of an algebraic converter device according to the invention will become apparent from the following description of the attached drawings, wherein.

Figure 1:
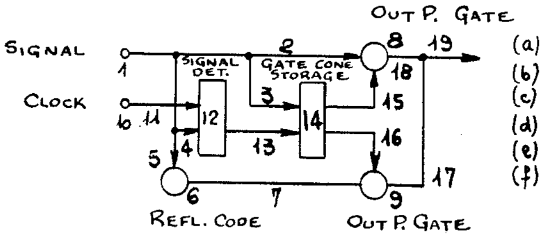
Fig. 1 shows a block schematic diagram of a converter device according to the invention.
Figure 3:
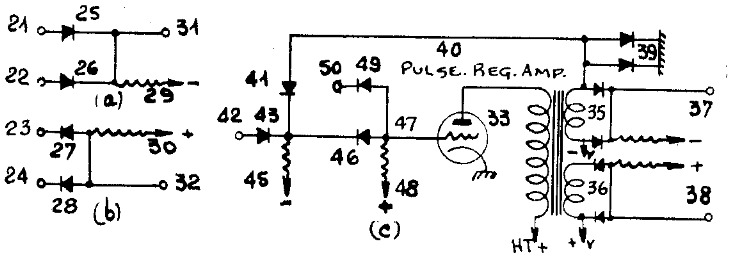
Figure 4:
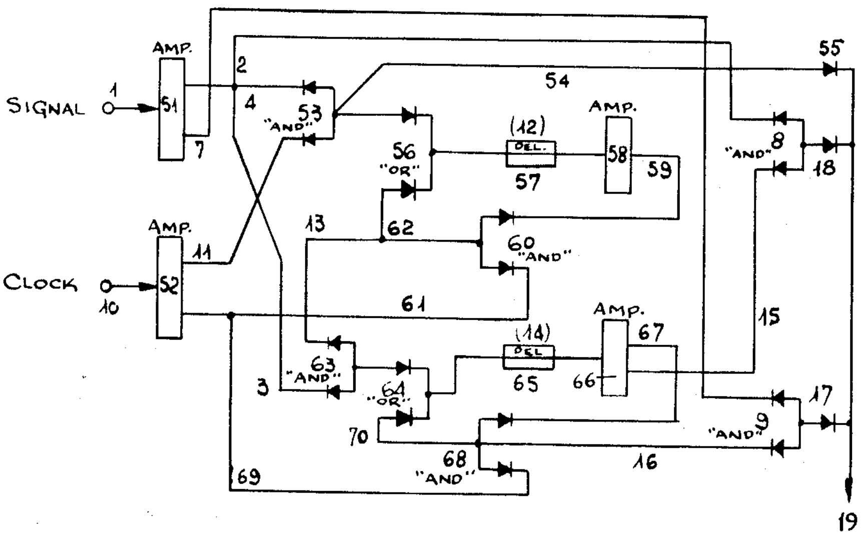

Fig. 3 recalls some known embodiments of component parts which may be used for embodying the scheme of Fig. 1; and, Fig. 4 shows an illustrative embodiment of an algebraic converter device according to the invention, which contains such component parts as shown in said Fig. 3.

Referring first to Fig. 1, the converter device is adapted to receive upon its input terminal 1 any incoming pulse train which has previously been encoded according to the above-defined process. Through the channel 2, this train is applied to one input of a gating circuit 8. The output of this gating circuit is connected to an output channel 19 for the issuing pulse train from the device.

Through a branch channel 5, any incoming pulse train also is applied to a circuit 6 which delivers a complementary presentation of said incoming train. The output 7 from said circuit 6 is connected to one input of a gating circuit 9. The output of said gating circuit 9 is connected through a conductor 17, to the output channel 19 of the device.

Further, the incoming pulse train is applied at 4 to one input of a coincidence detecting circuit 12. Said coincidence 12 receives upon its other input 11 a discrete pulse applied to the input terminal 10 at each first pulse period of any minor cycle of operation of the device. Any pulse in the sequence of pulses applied to the terminal 10 may be called a minor cycle pulse.

The coincidence circuit 12 is so arranged as to maintain the result of its operation, viz. the output of 12 referred to as 13 applies to the corresponding input of a further coincidence circuit 14 a voltage which represents the result of the coincidence or non-coincidence of the minor cycle pulse with the first pulse period of the concerned incoming train. But the circuit 12 is provided with a transfer time interval equal to the duration of a pulse period so that the resulting representative voltage at 13 appears at the second pulse period of the incoming train at 1 and is maintained through the remaining part of the concerned minor cycle.

The second coincidence circuit 14 receives on its other input 3 the said incoming pulse train, branched off the translating channel 2. It also presents a delay transfer time equal to a pulse period of the incoming train and also maintains at its outputs 15 and 16 voltages representative of this result. Its output 15 controls the condition of the gating circuit 8 and its output 16 similarly controls the condition of the gating circuit 9. However, the circuit 14 is so arranged that the result voltages at 15 and 16 always are complementary, viz. these voltages are always so related that when the gating circuit 8 is unblocked, for enabling the transmission therethrough of the pulse train applied to its other input, the circuit 9 is blocked, for impeding the transmission therethrough of the negative presentation pulse train applied to its other input, and conversely. As long as the circuits 12 and 14 have not detected any coincidence of pulses, the gating circuit 8 will transmit its input signal and the gating circuit 9 will not.

Figure 2:
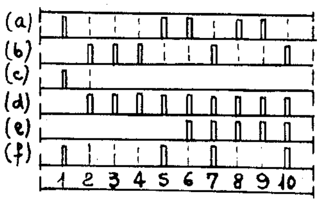
Fig. 2 illustrates the signals required for the operation of such a scheme.

Illustratively, one may consider the input coded pulse train shown at (*a*) in Fig. 2. This train is applied to the input terminal 1 of the device and is transmitted to the input of the gating circuit 8. Simultaneously, from the circuit 6, its complementary pulse train will be transmitted to the gating circuit 9, in the presentation shown at (*b*) in Fig. 2.

Considering a minor cycle comprising ten pulse periods, the first of which denotes the sign of the quantity, the arithmetical part of which is represented in the nine further pulse periods, the incoming pulse train (*a*) represents the algebraic value —216 and the negative coded train (*b*) will represent the algebraic value +295.

From 4, the coded pulse train (*a*) is applied to the first coincidence circuit 12 together with the minor cycle pulse in the concerned minor cycle. This first pulse period pulse is indicated at (*c*) in Fig. 2.

The coincidence circuit 12 operates and applies at 13 for each following pulse period of the minor cycle, a coincidence pulse, the time sequence of which is represented at (*d*) in Fig. 2.

At the fifth pulse period, the coincidence circuit 14 detects a coincidence with a (*d*) pulse of the first discrete pulse in the incoming train which has a digital significance. From the sixth pulse period to the tenth pulse period, the second coincidence circuit 14 will deliver an output pulse (*e*) at each pulse period. Each of these latter pulses (*e*) will render the gating circuit 9 so controlled as to transmit the pulses existing in the signal (*b*) of Fig. 2 but, on the other hand, will block the gating circuit 8 so that this circuit will not transmit any pulse of the signal (*a*) from the sixth to the tenth pulse period of the concerned minor cycle. From the first to the fifth pulse period, inclusively, said gating circuit 8 has transmitted any pulse existing in the signal (*a*).

The pulse train issuing at 19 from the converter device thus presents the configuration in timed pulses which is shown at (*f*) in Fig. 2. The algebraical value thus expressed at the output of the device is —296, the two's complemental value of —216, the value of the incoming train (*a*).

If the incoming train would be of the presentation shown at (*b*) in Fig. 2, no coincidence would have been detected and the gating circuit 8 would have been transmitting the incoming pulse train unchanged during the complete minor cycle, and the circuit 9 would have remained blocked for said minor cycle.

Several electronic lay-outs may be considered for embodying the block-schematic arrangement of Fig. 1. For instance the gating circuits 8 and 9 may be constituted with pentode gating tubes, receiving the pulses to transfer on their control grids and receiving the gating signals on their suppressor grids, whether these signals are electric pulses or D.C. voltages; the circuit 6 may consist of such a pentode tube receiving the (*a*) pulses through a polarity inverter stage on its control grid and having a periodical series of clock pulses applied to its suppressor grid, or conversely; each coincidence circuit, 12 or 14, may comprise such a pentode tube the output of which controls by one of its input a bistable trigger stage, of the bistable flip-flop kind for instance, the other input of which is actuated by reset pulses at the minor cycle frequency; and so forth.

In certain kinds of computers, however, operating according to the known rules of logical algebra and having recourse to the pulse-regenerative amplifier techniques, it obviously appears as an advantage to constitute also a device according to the invention according to the same technology. This will now be described with reference to the attached Figs. 3 and 4.

In Fig. 3, there is shown at (*a*) a well-known buffer circuit comprising a pair of diodes such as crystal diodes, 25 and 26. These elements have their cathodes connected to a common output terminal 31 and both cathodes receive at said common point a negative biasing voltage through a resistor 29. The anode of the diode 25 is connected to an input terminal 21 for the application thereto of a first input signal and the anode of the diode 26 is similarly connected to another input terminal 22 for the application thereto of a second input signal. Each signal appears as a change in the positive direction of a bias of lower value so applied to the input terminal that the diode is not conducting. When no signal is present, therefore, the voltage at 31 is low. When a signal appears at one or the other or at both the input terminals, the concerned diode is made conducting and the signal transmitted therethrough, the voltage at the output terminal rises to the value of the higher one of these input signals. Such a network embodies the logical operation "OR" (either one or both of two alternatives).

In Fig. 3, there is shown at (*b*) a well-known gate network, embodying the logical operation "AND" (both terms of an alternative but not either one of them). It includes a pair of diodes 27 and 28 having their anodes connected to a common output terminal 32 which receives a positive biasing voltage through a resistor 30. The cathode of the diode 27 is connected to an input terminal 29 for the application of a first input signal and the cathode of the diode 28 is connected to another input terminal 24 for the application thereto of a second input signal. Each signal is applied as a voltage rise at its terminal with respect to a lower bias on said terminal such that the diode is conducting when no signal exists. When no signal is present, the voltage at the output terminal is of said lower value. When one signal only appears at one of the input terminals, the output voltage remains low since the other diode remains conducting. When both signals simultaneously exist, on the other hand, the voltage of the output terminal rises up to the value of the positive bias applied to said terminal, since both elements are non-conducting.

A pulse-regenerative amplifier is shown at (*c*) in Fig. 3, in an illustrative lay-out. A vacuum triode tube 33 is provided with its plate battery voltage supplied through the primary winding of a transformer having two secondary windings 35 and 36. These secondary windings are coiled in respectively opposite directions so that the voltage across 35 reproduces the voltage on the control grid of the tube 33 and the voltage across 36 always is the complement or reverse of said voltage across 35. Terminals 37 and 38 are connected to these secondary windings through diode networks. These diode networks serve to cancel at these output terminals the backswing voltage which occurs in the transformer primary. Such backswing is due to the voltage use across the primary which occurs when triode 33 after having been conducting, is blocked. It is well-known that such backswing voltage is reflected in the secondary winding 35 as a decrease of voltage followed by a return to normal. This voltage change when appearing upon plates of diodes which are negatively biased from their cathodes, cannot be transferred therethrough. It also appears in the secondary winding 36 as a sudden rise of voltage followed by a return to normal and cannot be transmitted through the diodes as it is applied to the cathodes thereof and their plates are positively biased at a lower value. On the other hand, each time a signal S appears at 37, due to the application of a signal to the control grid of triode 33, this signal S will have a direction of variation identical with the direction of variation of this grid signal; at the same time at 38 a signal appears which has an opposite direction of variation. The latter signal will be denoted $\overline{S}$, according to a known notation of the Boolean algebra.

If any input signal to be applied to such an amplifier is misshaped, or even mutilated, this signal must be reshaped and to this end, the control grid of the vacuum tube 33 is reached by said signal through a network of the type shown in Fig. 3(*b*). Said network is constituted by the diodes 46 and 49 which have their anodes connected to the input 47 to the control grid and biased through the resistor 48 to a positive bias. When no signal exists, a negative bias through the resistor 45 and the diode 46 blocks the vacuum tube 33 and the terminal 50 to the diode 49 is also maintained at a negative potential. An input signal applied to the terminal 42 and, through the diode 43, to the diode 46, can only be transmitted to the control grid of the triode 33 when a gating signal is also applied to 50. The terminal 50 will receive clock pulses but these pulses also can be transmitted to said control grid only if a signal is present at 42. The regenerative process may easily be understood: an input signal at 42, viz a misshaped pulse, blocks the diode 46 and any well-shaped pulse at 50 which occurs during this input signal is then transmitted to the control grid of the triode. As the pulse at 42 may be mutilated, viz disappear before the end of a clock pulse at 50, a feedback connection 40 is provided from one end of the secondary winding 35 to the diode 46, through an additional diode 41. Diode elements 41–43 constitute a network of the (*a*) kind of Fig. 3. At 39 in said feedback connection is shown a voltage level limiting network.

A device constructed according to the principles of the invention and employing the three components illustrated in Fig. 3 is shown in Fig. 4. The input terminals 1 and 10 are connected to the inputs of the respective amplifiers 51 and 52 which may be of the kind of pulse-regenerative amplifier shown at (*c*) in Fig. 3, at least for the circuit 51 (circuit 52 may comprise the vacuum tube with its output transformer). The input terminal 1 receives a coded train such as (*a*) in Fig. 2. The ouput signal *a* from the amplifier 51 is applied to the conductors 2, 3 and 4. The complementary signal $\bar{a}$ is applied to the lead 7. This signal $\bar{a}$ is the one shown at (*b*) in Fig. 2, viz what has been called the negative presentation of the input coded train. The input terminal 10 receives the sequence (*c*) of Fig. 2, and this signal *c* is transferred on the lead 11 whereas its negative presentation, viz (*d*), Fig. 2, herein dénoted *c* for the embodiment of Fig. 4, appears on the leads 61 and 69 from the amplifier 52.

The component circuit 12 of Fig. 1 comprises: a coincidence detecting network 53, which is of the kind of the (*b*) network in Fig. 3, a further diode network 56 one input of which is connected to the output of the network 53, and a pulse-regenerative amplifier 58 the output of which at 59 (corresponding to the output 37 of the pulse-regenerative amplifier in Fig. 3) is fed back through a coincidence detecting network 60, through the lead 62 to the input terminal of the network 56 not connected to the output of the coincidence detecting network 53. This arrangement constitutes a storage loop having a delay transit time equal to one pulse period $\theta$, from the insertion of a delay element 57 between the output of the network 56 and tne input of the pulse-regenerative amplifier 58. The network 60 controls the preservation and the cancellation of the storage of an impulse within said storage arrangement. This network receives from 61 the signal *c* which comprises a positive discrete pulse at any pulse period other than the first one in any minor cycle. At said first pulse period, the network 60 is not conducting and if a pulse issues at 59 from the regenerative amplifier (from a storing of the sign-representing digit in the next prior minor cycle of operation) said minus-sign digit is cancelled out. But if at the same instant, a new minus-sign digit comes from the network 53 to the network 56, this new digit will be introduced in the storage loop for another minor cycle.

The connection 13 from the coincidence and storage circuit 12 to the coincidence and storage circuit 14 is taken from 62.

The second coincidence and storage circuit 14 is constituted in a quite similar arrangement as that of the circuit 12.

It includes: a coincidence detecting network 63 of the (*b*) kind of Fig. 3, one input of which receives the signal which has been called *a* and the other of which receives the signal which has been called *d*; a buffer network 64, one input of which receives the output signal from 63 and the output of which is connected through a delay line 65 to the input of a pulse-regenerative amplifier 60; the output 67 of said pulse-regenerative amplifier (corresponding to the output 37 in Fig. 3), is fed back to one input of a gate or coincidence circuit 68, the output of which, through the lead 70, is connected to the other input of the buffer network 64. The transit time in the storage loop thus defined is equal to a pulse period of the concerned device. The gate circuit 68 is controlled from the gating pulses $\bar{c}$ from the amplifier 52, through the lead 69.

In Fig. 4, the representation of the buffer and gate networks has been simplified by the omission of the biasing resistors.

Gating circuits 8 and 9 each comprise a gate network. One input of the network 8 receives the signal *a* through the lead 2 and the other input of said network receives the negative output from the pulse-regenerative amplifier 66 through the lead 15. One input of the network 9 receives the negative output from the amplifier 51 (circuit 6 of Fig. 1 is constituted by the corresponding secondary winding in said amplifier 51) and the other input of said network receives the output of the network 68 in the feedback loop of the coincidence and storage circuit 14, through the lead 16.

The output channel 19 of the device receives: (*a*) the output signal from 53, through the lead 54; (*b*) the output signal from the gating circuit 8; (*c*) the output signal from the gating circuit 9. These three signals are applied to 19 respectively through the buffer diodes 55, 18 and 17.

The output signal, *f*, thus is the result of the additive combination of the three signals $a.c$ (from 53), $a.\bar{e}$ (from 8) and $a.e.\bar{c}$ (from 9). The reference *d* is preserved for the signal in the storage loop of 12 and the reference *e* then denotes the signal in the storage loop of the circuit 14. For an input signal *a*, the output signal is:

$$f=a.c+a.\bar{e}+\bar{a}.e.\bar{c}$$

The first term $a.c$ of this summation may only be present if in the first pulse period of a minor cycle, a minus-sign pulse exists in the first pulse period of the incoming train. In this case only $a=c=1$. At any pulse period of any minor cycle other than the first one, $c=0$ and cnsequently $a.c=0$. If the incoming pulse train carries a positive quantity or value, the minus-sign digit is absent in its first pulse period and $a=0$, consequently $a.c=0$.

The second term $a.\bar{e}$ will only be present for an incoming pulse train representing a positive quantity or value. For such a train, the network 53 will not deliver any pulse to the lead 54 and the input buffer 56 of the storage loop of 12. If a pulse were stored in the preceding minor cycle, this pulse will be erased at 60, and the signal $d.\bar{c}$ will then remain at its lower value during the remaining pulse periods of the minor cycle. Consequently the signal $e$ will not exist and the signal $\bar{e}$ will exist, viz. will have its higher value. It is the network 8 which will remain transmitting the incoming coded pulse train, through the lead 2, during the whole of the concerned minor cycle.

In such a case, the signal $e$ remaining at its lower value, the signal $e.\bar{c}$ will not be present and the gating circuit 9 will not transmit any signal to the output 19 during such a minor cycle.

When the incoming train represents a negative numerical value, on the other hand, a discrete pulse is at the first pulse period of the concerned minor cycle, delivered by 53 and stored in the circuit 12. From the second pulse period to the last one in this minor cycle, the signal $d.\bar{c}$ will be of its higher voltage value and the gate 63 will transmit the incoming signal $a$ from its second to its last digital values, to the circuit 14, each time in said signal $a$ a discrete pulse will be present. This may be otherwise stated by saying that no pulse will be stored in 14 before the first discrete pulse occurs at a pulse period of the incoming train which follows the first pulse period of this train.

During the time interval following the first pulse period of a negatively coded incoming train and its pulse period wherein appears the first digital value 1 in this train, the second, third and fourth pulse periods in the illustrative representation of $a$ in Fig. 2, the signal $\bar{e}$ will remain at its higher value and the gating network 8 will transmit the first discrete pulse occurring in the incoming train at a pulse period other than its first pulse period. But, simultaneously to this transmission of an output pulse through 8, this pulse is stored in the loop of the circuit 14 so that, from this instant and to the end of the minor cycle, the gating circuit 8 is controlled to be inactive from the output 15 of the pulse-regenerative amplifier 66 of said circuit 14.

If on the other hand, the condition $e=1$ and $\bar{c}=1$ is created then the gating circuit 9, receiving $e.\bar{c}$ on one of its inputs, will be unblocked. Thus the negative of the incoming train, $\bar{a}$, will be transmitted to the output channel 19 for the remaining part of the minor cycle. In the example of Fig. 2, the gating circuit 9 will be unblocked at the sixth pulse period of the minor cycle. During the concerned part of the minor cycle, it is the third term $\bar{a}.e.c$ of $f$ which will act to constitute said output signal $f$.

Having now described the invention, what is claimed is:

1. In an electric device for translating coded pulse trains, input means for delivering both the direct and the ones-complement representations of incoming pulse trains, input means for delivering both the direct and the ones-complement representations of clock pulses throughout a minor cycle, buffer means having several inputs, first and second gating means, and first and second one-digit stores; the first one-digit store being fed from the direct incoming pulse and clock train inputs and feeding together with the direct incoming pulse train input the second one-digit store to produce outputs complementary to each other; the first gating means feeding the direct incoming pulse train under control of one of said complementary outputs to one input of the buffer means; and the second gating means feeding the complement of said incoming pulse train under control of the second complementary output and the complement of said clock pulses to another input of said buffer means, and additional gating means feeding the direct incoming pulse train under control of the direct clock pulses to a third input of said buffer means.

2. Device according to claim 1 wherein each of said one-digit stores consists of a recirculating storage circuit having an overall transit time equal to one pulse period and including means for erasing registration at each first pulse period of any minor cycle of the device.

3. Device according to claim 2 wherein said erasing means comprise gating means controlled from the complement of a clock pulse train comprising only a discrete clock pulse at its first pulse period.

4. Device according to claim 3 wherein said input means for delivering said incoming pulse train include a transformer having at least one secondary winding coupled to the direct pulse train input repeating the incoming pulse train and a second secondary winding, also coupled to the direct pulse train input of opposite direction of winding with respect to the first, for delivering the complement of said incoming pulse train, and wherein the means for delivering said clock pulse train also include a transformer having at least one secondary winding coupled to the direct clock train input for repeating the incoming clock pulse train and a further secondary winding, also coupled to the direct clock train input, of opposite direction of winding with respect to the first for delivering the complement of said clock pulse train.

5. Device according to claim 2 wherein each recirculating storage circuit includes a pulse-regenerative amplifier and wherein at least the pulse-regenerative amplifier in said second one-digit store includes an output transformer having windings of opposite winding direction connected to conduct said input signal and its complementary representation, respectively, to said first and second gating means.

6. In an electric device for translating coded pulse trains, input means for delivering both the direct and the ones-complement representations of incoming pulse trains, and both the direct and the ones-complement representations of clock pulses throughout a minor cycle first and second gating means, and first and second one-digit stores, and a number of output channels; the first one-digit store being under control of the direct incoming pulse and clock trains and controlling together with the direct incoming pulse train the second one-digit store to produce outputs complementary to each other; the first gating means feeding the direct incoming pulse train under control of one of said complementary outputs to one output channel and the second gating means feeding the complement of said incoming pulse train under control of the second complementary output and the complement of said clock pulses to another output channel, and means for combining said output channels.

7. Device according to claim 6 comprising additional gating means feeding the direct incoming pulse train under control of the direct clock pulses to a third output channel.

8. In a code processing system, means for delivering direct and complementary representations of signal and clock pulse trains, first gating means under control of a discrete pulse in the first pulse period of a signal train, second gating means under control of another discrete pulse in another part of the signal train following said first pulse period, and having complementary outputs; and means controlled from said first and second pulse responsive means for transforming said other part of said incoming pulse train into a complementary representation thereof including a pair of gating means; one of said gating means under control of at least one of said complementary outputs, and the other of said gating means under control of at least the other of said complementary outputs and said complementary clock representation; said two gating means having inputs supplied respectively from said direct and complementary signal representations, and having a common output channel.

9. Code processing system according to claim 8, wherein said first gating means include means controlled from a clock pulse signal occurring in said first pulse period of any minor cycle wherein an incoming coded train may occur, and a one-digit storage circuit connected at the output of said gating means; and wherein said second gating means include means controlled from the output of said one-digit storage circuit in said first responsive means, and a one-digit storage circuit connected at the output of said gating means.

10. Code processing system according to claim 8, wherein said first and second gating means include a recirculating storage circuit having an overall transit time equal to one pulse period and means in said recirculating circuit for erasing their registration at each first pulse period of any minor cycle of the device.

11. Code processing system according to claim 10 wherein said erasing means comprises means controlled from a complementary representation of a clock pulse train comprising only a discrete clock pulse at its first pulse period.

12. Code processing system according to claim 8 wherein said pulse delivering means include transformers each having at least one secondary winding coupled to the direct train inputs; for repeating the incoming signal and clock trains respectively and a second secondary winding, coupled to the direct train inputs, of opposite winding direction for delivering the complementary representations of said incoming trains; recirculation storage circuits in said first and second gating means and having means under control of complementary representation of a clock pulse train for erasing registration at each first pulse period of any minor cycle of the device.

13. Code processing system according to claim 8 comprising recirculating storage circuits in said first and second gating means each including a pulse-regenerative amplifier; and wherein at least the pulse-regenerative amplifier in said second gating means includes an output transformer having windings of opposite winding direction connected to conduct respectively said input signal and its complementary representation to said common output channel.

References Cited in the file of this patent

UNITED STATES PATENTS

| | | |
|---|---|---|
| 2,776,794 | Williams et al. | Jan. 8, 1957 |
| 2,799,450 | Johnson | July 16, 1957 |
| 2,803,401 | Nelson | Aug. 20, 1957 |

OTHER REFERENCES

Basic Circuitry of the MIDAC and MIDSAC, D Turk et al., University of Michigan Egnineering Research Institute Report, 1947–2T, 1947, pages II–I0–II–I3, and III–I–III–6 relevant.

"Universal High Speed Digital Computers: Serial Computing Circuits," by Williams, Kilburn and Robinson, Proc. of the Institution of Electrical Engineers, April 1952, pages 107–123.

"A Short Description of the Edsac Type Calculator Circuits Used in Leo," by Pinkerton, pages 14 to 18, 23 and 50, January 1954.